United States Patent [19]
Ohgoda

[11] Patent Number: 5,180,915
[45] Date of Patent: Jan. 19, 1993

[54] RADIATION IMAGE INFORMATION READING APPARATUS

[75] Inventor: Makoto Ohgoda, Kanagawa, Japan
[73] Assignee: Fuji Photo Film Co., Ltd., Kanagawa, Japan
[21] Appl. No.: 685,768
[22] Filed: Apr. 16, 1991
[30] Foreign Application Priority Data
  Apr. 20, 1990 [JP] Japan .................. 2-105678
[51] Int. Cl.$^5$ ............................................. G01N 23/04
[52] U.S. Cl. .................................................. 250/327.2
[58] Field of Search .......................... 250/327.2, 484.1
[56] References Cited
U.S. PATENT DOCUMENTS
  4,737,641  4/1988  Lange et al. ............... 250/484.1 B
  5,038,037  8/1991  Saotome ..................... 250/484.1 B
FOREIGN PATENT DOCUMENTS
  60-264482  11/1985  Japan .
  262100     12/1985  Japan ..................... 250/327.2 E

*Primary Examiner*—Carolyn E. Fields
*Attorney, Agent, or Firm*—Sughrue, Mion, Zinn, Macpeak & Seas

[57] ABSTRACT

A radiation image information reading apparatus which comprises a holding unit in which a cassette for accommodating therein a stimulable phosphor sheet having both sides thereof on which radiation image information is stored and recorded, is detachably held. A feeding device feeds the stimulable phosphor sheet in predetermined directions, and a reading unit disposed on one side of the stimulable phosphor sheet (above the same) exposes one of the both sides of the stimulable phosphor sheet to exciter rays to photoelectrically read information via light emitted from the stimulable phosphor sheet. An erasing unit disposed on the other side of the stimulable phosphor sheet (below the same) erases radiation image information which remains on the other of the both sides of the stimulable phosphor sheet.

7 Claims, 5 Drawing Sheets

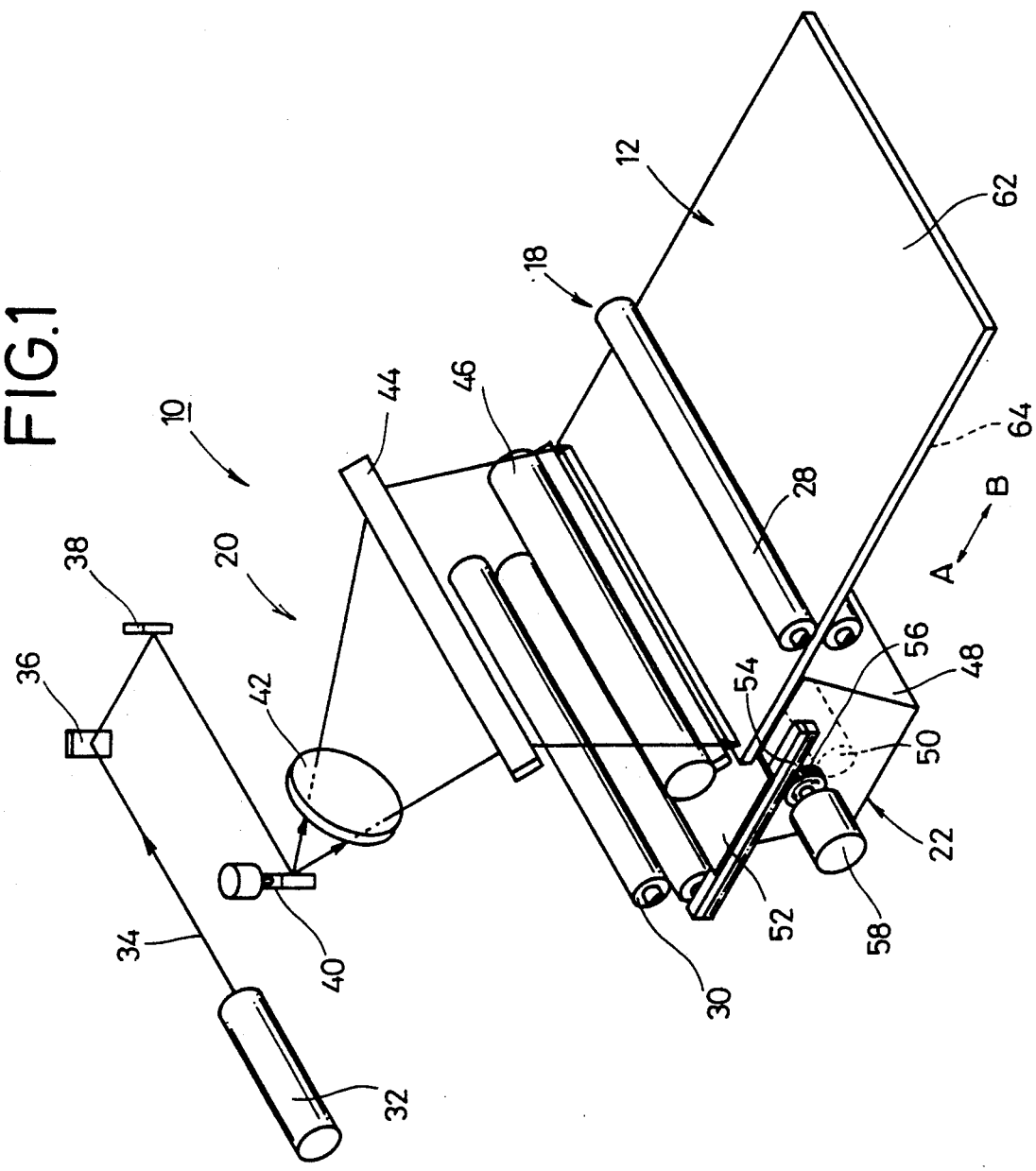

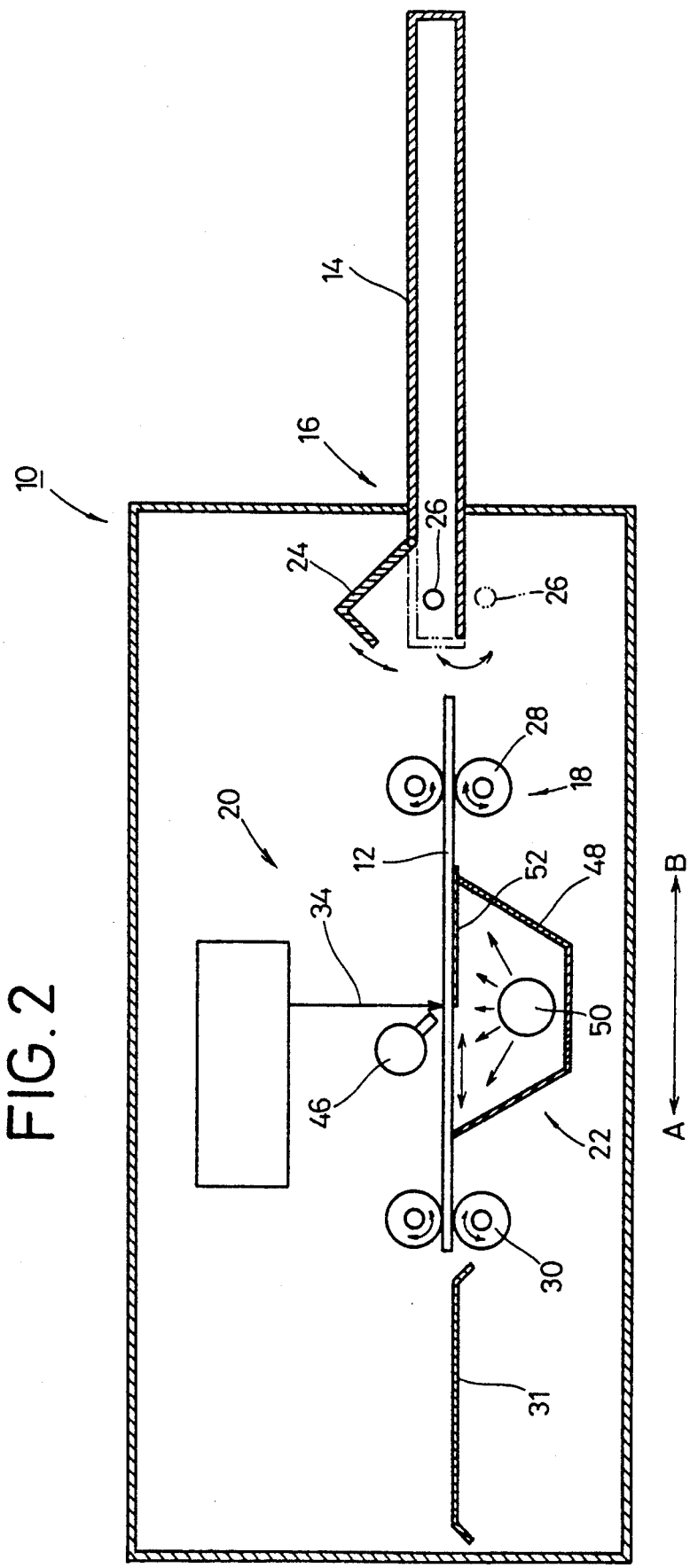

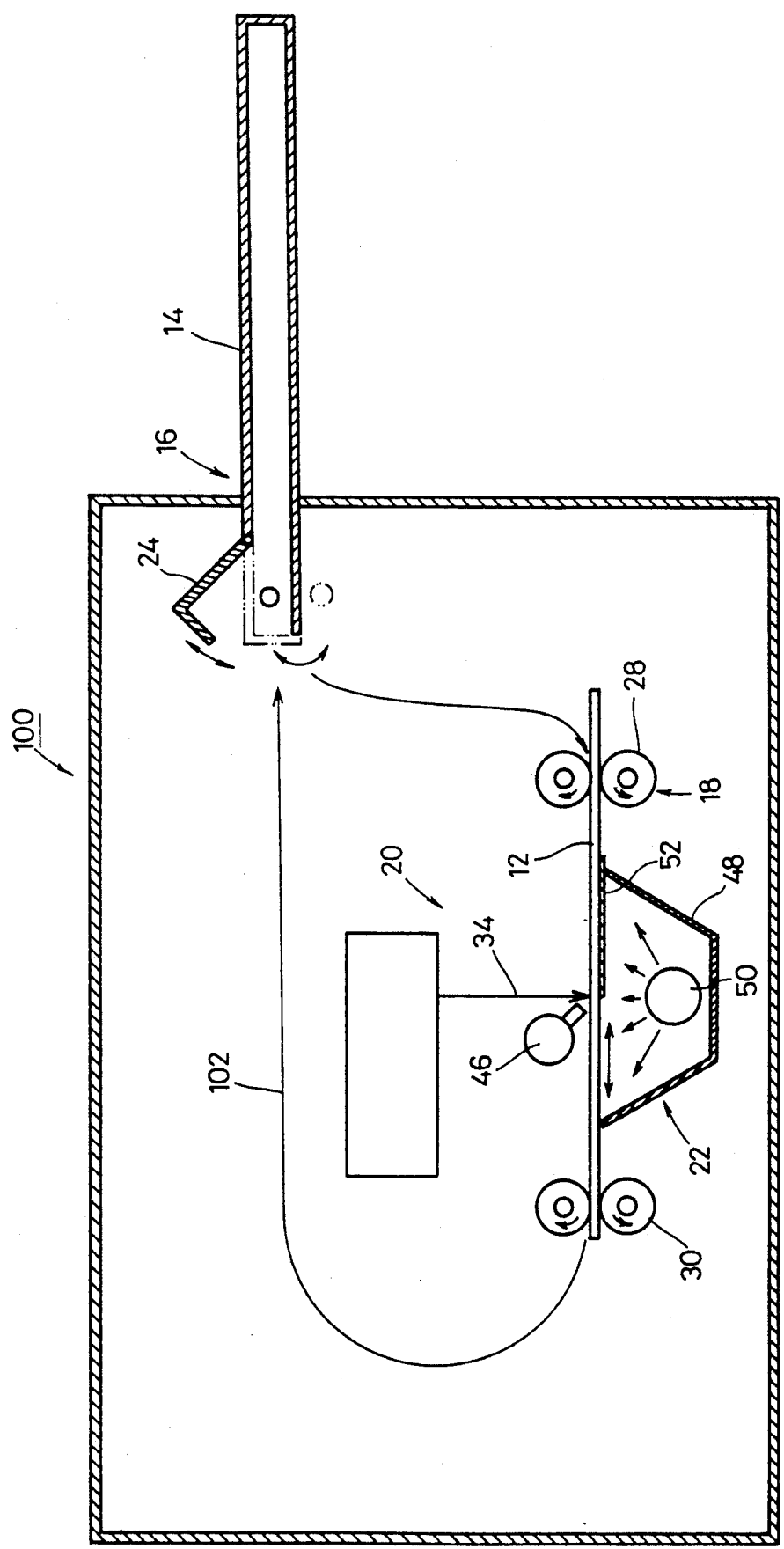

RADIATION IMAGE INFORMATION READING APPARATUS

BACKGROUND OF THE INVENTION

1. Field of the Invention

The present invention relates to a radiation image information reading apparatus capable of simultaneously performing reading and erasing processes with respect to a double-sided stimulable phosphor sheet (also referred to as a stimulable phosphor sheet) on which radiation image information can be recorded on both sides.

2. Description of the Related Art

In a radiation image information reading apparatus for producing a radiation-transmitted image of an object, an easy-to-handle stimulable phosphor sheet (accelerated phosphor sheet) is finding wider use as an alternative to a conventional X-ray.

When a certain phosphor is exposed to a radiation such as X-rays, $\alpha$-rays, $\beta$-rays, $\gamma$-rays, cathode rays, ultraviolet rays, etc., the phosphor stores a part of the energy of the radiation. When the phosphor exposed to the radiation is then exposed to stimulating rays such as visible light, etc., the phosphor emits accelerated light in proportion to the stored energy of the radiation. A phosphor which exhibits such a property is referred to as a "stimulable phosphor" or a "stimulable phosphor".

In the radiation image information reading apparatus, the stimulable phosphor sheet exposed to the radiation through an object such as a human body is scanned with stimulating rays such as a laser beam, so that the stimulable phosphor sheet emits accelerated light indicative of the radiation image. The emitted light is then photoelectrically read to produce an image signal. Thereafter, image information generated based on the so-produced image signal is recorded as a visible image on a recording medium such as a photographic film or displayed as a visible image on a CRT or the like.

In this case, the stimulable phosphor sheet may simply bear the image information until it is scanned with the stimulating rays. It is desirable however that the image information can be erased from the stimulable phosphor sheet after completion of its scanning so the stimulable phosphor sheet can be used again in a process for recording image information thereon. For this purpose, for example, there has been proposed an apparatus of such a type that an erasing unit is located downstream of the stimulable .phosphor sheet which is fed in an auxiliary scanning direction, as seen from a position where the stimulable phosphor sheet is scanned, and the stimulable phosphor sheet is exposed to the stimulating rays while feeding the stimulable phosphor sheet discharged from a cassette in the auxiliary scanning direction, followed by scanning with the stimulating rays thereby emitting light for reading photoelectrically, i.e., detecting the so-emitted light to produce an image signal indicative of image information, followed by execution of a process for erasing the image information from the stimulable phosphor sheet under the control of the erasing unit (see Japanese Patent Application No. 60-264482).

However, the processes for reading the radiation image information from the stimulable phosphor sheet and erasing the same therefrom are performed in a separate manner in the above-described radiation image information reading apparatus. Therefore, each of the radiation image information reading/erasing processing operations cannot efficiently be performed in its entirety.

Further, the scanning unit and the erasing unit are arranged side by side along the auxiliary scanning direction, thereby causing a problem that both the total radiation image information reading apparatus and the space it takes become very large.

SUMMARY OF THE INVENTION

It is a principal object of the present invention to provide a radiation image information reading apparatus capable of simultaneously performing reading and erasing processes with respect to a stimulable phosphor sheet and easily reducing the apparatus in size in its entirety.

It is another object of the present invention to provide a radiation image information reading apparatus comprising a reading unit disposed on one side of a double-sided stimulable phosphor sheet capable of storing radiation image information on both sides, the reading unit being used to expose one of said both sides thereof to a stimulating ray for thereby photoelectrically reading information via light emitted from the stimulable phosphor sheet, and an erasing unit disposed on the other side thereof to erase radiation image information which remains on the other of said both sides thereof.

It is a further object of the present invention to provide the apparatus wherein the reading unit and the erasing unit are positioned in an opposing relationship to each other with the stimulable phosphor sheet interposed therebetween.

It is a still further object of the present invention to provide the apparatus wherein the erasing unit comprises an erasing light source and a light shielding member movable toward and away from the direction in which the storage type phosphor sheet is fed, for preventing erasing light emitted from the erasing light source from entering the reading unit.

It is a still further object of the present invention to provide the apparatus further including drive means for displacing the light shielding member back and forth along the stimulable phosphor sheet in synchronism with the feeding of the stimulable phosphor sheet.

It is a still further object of the present invention to provide the apparatus still further including a casing whose one end on the side of the stimulable phosphor sheet is opened, and wherein the erasing light source is disposed within the casing and the light shielding member is movably provided on the side of the opened one end of the casing.

It is a still further object of the present invention to provide the apparatus still further including a feed system for feeding the stimulable phosphor sheet taken out of the cassette to the cassette in a position in which the stimulable phosphor sheet is reversed with respect to a position in which the stimulable phosphor sheet has been taken out of the cassette.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

FIG. 1 is a schematic perspective view showing a radiation image information reading apparatus according to one embodiment of the present invention;

FIG. 2 is a longitudinal cross-sectional view depicting the radiation image information reading apparatus shown in FIG. 1;

FIG. 5 is a schematic perspective view illustrating a radiation image information reading apparatus according to another embodiment of the present invention.

DETAILED DESCRIPTION OF THE PREFERRED EMBODIMENTS

Figure 3A:
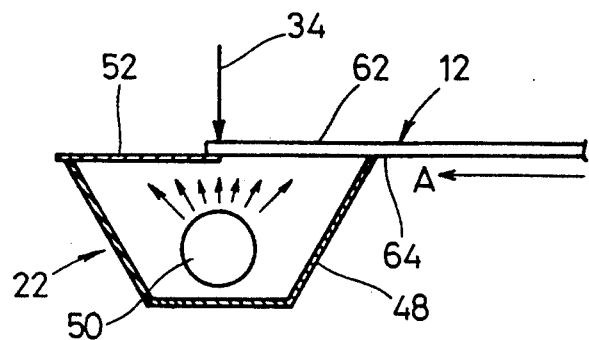
FIG. 3 is a diagram for describing the operation of the radiation image information reading apparatus.

Referring to FIGS. 1 and 2, designated at numeral 10 is a radiation image information reading apparatus according to one embodiment of the present invention. The radiation image information reading apparatus 10 comprises a holding unit 16 in which a cassette 14 for accommodating therein a stimulable phosphor sheet 12 having both sides thereof on which radiation image information is stored, is detachable held, a feeding means 18 for feeding the stimulable phosphor sheet 12 in the directions indicated by arrows A and B, a reading unit 20 disposed on one side of the storage type phosphor sheet 12 (above the same) for exposing one of said both sides of the stimulable phosphor sheet 12 to stimulating rays so as to photoelectrically read information via light emitted from the stimulable phosphor sheet 12, and an erasing unit 22 disposed on the other side of the stimulable phosphor sheet 12 (below the same) for erasing radiation image information which remains on the other of said both sides of the stimulable phosphor sheet 12.

The holding unit 16 has an unillustrated opening/closing mechanism for opening and closing a cover 24 of the cassette 14, and a roller 26 shiftable to positions indicated by the solid line and the two-dot chain line in FIG. 2 and rotatable about the positions, for introducing the stimulable phosphor sheet 12 accommodated in the cassette 14 into the radiation image information reading apparatus 10.

The feeding means 18 comprises feed rollers 28, 30 each arranged in pairs with a predetermined interval defined therebetween. The feed rollers 28 and 30 are rotatably driven by a rotating drive source (not shown) in synchronism with each other. A guide plate 31 is provided adjacent to the feed rollers 30.

The reading unit 20 has a laser beam source 32, and mirrors 36, 38, a light polariscope 40 such as a galvanometer mirror, a scanning lens 42 such as a f$\theta$ lens and a mirror 44, all of which are arranged along an optical path of a stimulating ray (laser beam) produced from the laser beam source 32. Then, the stimulable phosphor sheet is scanned with the stimulating ray so as to emit accelerated light therefrom. Thereafter, the accelerated light thus emitted is photoelectrically read by a photomultiplier 46 as a photoelectric reading means.

The erasing unit 22 comprises an erasing light source 50 accommodated in a casing 48, a light shielding member 52 movable toward and away from the direction in which the stimulable phosphor sheet 12 is fed, for shielding the erasing light emitted from the erasing light source 50, which enters the reading unit 20. A rack 54 is attached to the light shielding member 52, and a pinion 56 maintained in meshing engagement with the rack 54 is connected to a motor 58.

Incidentally, an actuator such as a linear solenoid, etc. may be attached to the light shielding member 52 as an alternative to the rack/pinion mechanism referred to above.

Figure 4:
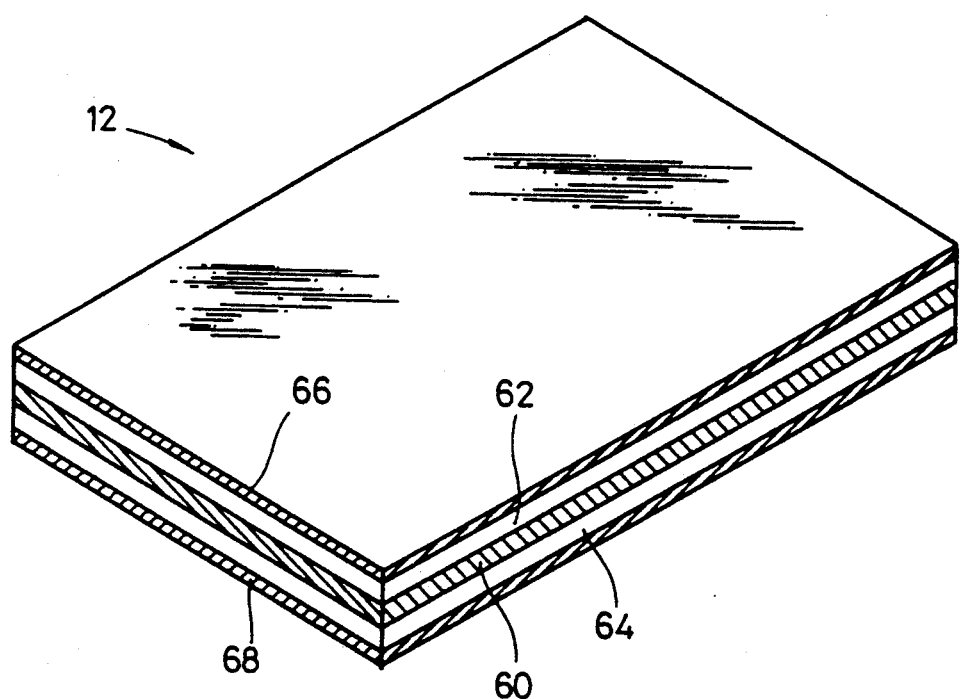
FIG. 4 is a perspective view showing a stimulable phosphor sheet.

As shown in FIG. 4, the stimulable phosphor sheet 12 comprises a flat support material 60 comprised of a member having light-shielding characteristics, phosphor layers 62, 64 comprised of stimulable phosphors which are applied on both faces of the support material 60, and protective films 66, 68 for covering the phosphor layers 62, 64 respectively.

The support material 60 is formed of a member having light-shielding characteristics, which is comprised of a polyethylene terephthalate (PET) mixed with carbon or the like in order to prevent radiation from being transmitted from one of both faces of the support material 60 to the other thereof upon recording of radiation image information. On the other hand, each of the phosphor layers 62, 64 is a layer comprised of bonding materials including particles of a stimulable phosphor (an accelerated phosphor) in a dispersed manner and supporting the same.

The radiation image information reading apparatus 10 according to the present embodiment is constructed as described above. The operation of the apparatus 10 will now be described.

A description will hereinafter be made of a process for reading radiation image information recorded in the phosphor layer 62 and a process for erasing radiation image information which remains in the phosphor layer 64 after reading of the radiation image information has been completed, in the stimulable phosphor sheet 12.

The stimulable phosphor sheet 12 is loaded into the holding unit 16 of the radiation image information reading apparatus 10 in a state in which the stimulable phosphor sheet 12 is accommodated in the cassette 14. The unillustrated opening/closing mechanism of the holding unit 16 is actuated to open the cover 24. Thereafter, the roller 26 enters the cassette 14 so as to be rotated therein for thereby introducing the stimulable phosphor sheet 12 into the radiation image information reading apparatus 10. Then, the stimulable phosphor sheet 12 is held between the feed rollers 28 under the control of the feeding means 18, and then fed in the direction indicated by the arrow A. As a consequence, the stimulable phosphor sheet 12 reaches a position to be scanned.

As shown in FIG. 3a, when a tip portion of the stimulable phosphor sheet 12 reaches a position where it is brought into sliding engagement with the light shielding member 52, the reading unit 20 is activated, so that the stimulating ray 34 produced by the laser beam source 32 is applied in a main scanning direction to the stimulable phosphor sheet 12 which is fed in an auxiliary scanning direction indicated by the arrow A. As a consequence, accelerated light corresponding to the radiation image information is emitted from the phosphor layer 62. The accelerated light thus emitted is introduced into the photomultiplier 46 and thereafter converted into an electric signal. Incidentally, the radiation image information as the electric signal is recorded as a visible image on a recording medium such as a photographic film or displayed as a visible image on a CRT or the like.

On the other hand, when the tip portion of the stimulable phosphor sheet 12 reaches the position where it is brought into sliding engagement with the light shielding member 52 as described above, the movement of the stimulable phosphor sheet 12 is stopped for a predetermined period of time. Then, the erasing light source 50 is energized so that the tip portion of the phosphor layer 64 from which the radiation image information has been read is irradiated by the erasing light. As a consequence, the radiation image information, which remains in the tip portion thereof, is fully erased.

Figure 3B:
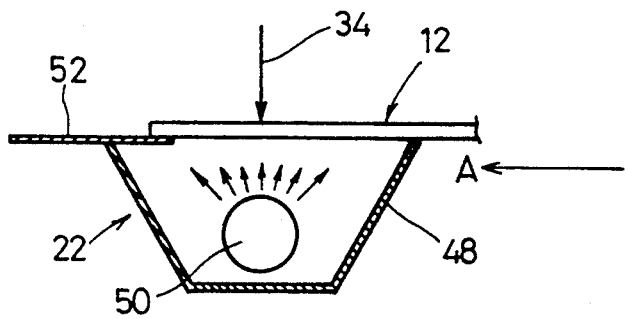
Figure 3C:
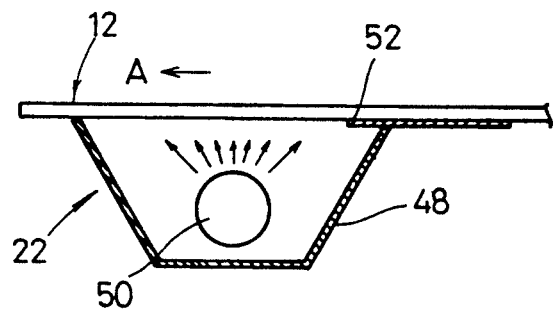

Then, the motor 58 is actuated to cause the pinion 56 and the rack 54 to move the light shielding member 52 in the direction indicated by the arrow A in synchronism with the feeding of the stimulable phosphor sheet 12 (see FIG. 3b). Then, the light shielding member 52 is moved in the direction indicated by the arrow B when an upwardly-opened portion of the casing 48 is covered over its entirety with the stimulable phosphor sheet 12 (see FIG. 3c).

When the stimulable phosphor sheet 12 is further fed in the direction indicated by the arrow A and its rear end is positioned on the light shielding member 52, the stimulable phosphor sheet 12 stops moving for a predetermined period of time so that a process for erasing the radiation image information from the rear end of the phosphor layer 64 is performed. Further, the rollers 28 and 30 are actuated so as to be rotated in the opposite direction, so that the stimulable phosphor sheet 12 is moved in the direction indicated by the arrow B.

In the present embodiment, the reading and erasing processes are simultaneously performed with respect to both sides of the stimulable phosphor sheet 12, thereby making it possible to process the stimulable phosphor sheet 12 in an extremely short time.

Further, the erasing light source 50 is accommodated in the casing 48 and the light shielding member 52 is disposed toward and away from the upwardly-opened portion of the casing 48. Therefore, the inside of the casing 48 can substantially optically be shielded tight by the casing 48, the light shielding member 52 and the stimulable phosphor sheet 12, thereby making it possible to prevent the erasing light produced from the erasing light source 50 from entering the reading unit 20 (see FIGS. 3a and 3c).

Furthermore, since the reading unit 20 and the erasing unit 22 are disposed upwards and downwards, the overall configuration of the radiation image information reading apparatus 10 is not made longer in the transverse direction thereof, thereby making it possible to reduce the radiation image information reading apparatus 10 in size.

Incidentally, the erasing unit 22 has the movable light shielding member 52. However, the erasing unit 22 may be constructed by a stationary-type light shielding member and a movable casing.

A radiation image information reading apparatus 100 according to another embodiment will now be shown in FIG. 5. The same elements of structure as those in the above-described radiation image information reading unit 10 are identified by like reference numerals and their detailed description will therefore be omitted.

In this case, the radiation image information reading apparatus 100 has a feed system 102 for feeding the stimulable phosphor sheet 12 which is discharged from the cassette 14 and passes between the reading unit 20 and the erasing unit 22 to the cassette 14 in a position in which the stimulable phosphor sheet 12 is reversed with respect to a position in which it has been taken out of the cassette 14. Incidentally, the feed system 102 comprises rollers and/or a belt.

Thus, a face of the tip portion of the stimulable phosphor sheet 12, from which the radiation image information has been erased, faces in an opposing relationship to one of both sides of the cassette 14 at all times. Further, a process for recording new radiation image information on the stimulable phosphor sheet 12 can be performed from said one of both sides thereof.

The radiation image information reading apparatus according the present invention which is constructed as described above, has the following effects and advantages.

It is possible to simultaneously perform the process for exposing the one of both sides of the stimulable phosphor sheet to the stimulating rays so as to photoelectrically read the information via the light emitted from the stimulable phosphor sheet and the process for erasing the radiation image information which remains on the other of both sides of the stimulable phosphor sheet. Therefore, each of the radiation image information reading/erasing processing operations can efficiently and easily be performed in its entirety.

Further, the reading and erasing units can be accommodated in a narrow space and hence the radiation image information reading apparatus can be rendered small in size over its entirety.

Having now fully described the invention, it will be apparent to those skilled in the art that many changes and modifications can be made without departing from the spirit or scope of the invention as set forth herein.

What is claimed is:

1. A radiation image information reading apparatus adapted for use with a double-sided storage type phosphor sheet having first and second sides and capable of storing radiation image information on said first and second sides, comprising:
   at least one reading unit, all of the reading units being disposed on one side of a double-sided storage type phosphor sheet when said sheet is received by said apparatus, respective ones of said reading units exposing said one of said first and second sides of said storage type phosphor sheet to a stimulating ray for thereby photoelectrically reading information via light emitted from said storage type phosphor sheet; and
   at least one erasing unit, all of the erasing units being disposed on the other of said first and second sides of said storage type phosphor sheet when said sheet is received by said apparatus to erase radiation image information on the other of said first and second sides of said storage type phosphor sheet, said erasing units being disposed in a position substantially opposed to said reading units,
   wherein an operation of said reading units reading said information from said one of said first and second sides of said storage type phosphor sheet and an operation of said erasing units erasing said image information from said other of said first and second sides of said storage type phosphor sheet are simultaneously performed with respect to said first and second sides of said phosphor sheet.

2. The apparatus according to claim 1, wherein said reading units and said erasing units are positioned in an opposing relationship to each other with said storage type phosphor sheet interposed therebetween.

3. The apparatus according to claim 1, further including a cassette for storing said storage type phosphor sheet, and a feed system for feeding said storage type phosphor sheet taken out of said cassette to said cassette in a position in which said storage type phosphor sheet is reversed with respect to a position in which said storage type phosphor sheet has been taken out of said cassette.

4. A radiation image information reading apparatus adapted for use with a double-sided storage type phosphor sheet having first and second sides and capable of storing radiation image information on said first and second sides, comprising:

at least one reading unit, all of the reading units being disposed on one side of a double-sided storage type phosphor sheet when said sheet is received by said apparatus, respective ones of said reading units exposing said one of said first and second sides of said storage type phosphor sheet to a stimulating ray for thereby photoelectrically reading information via light emitted from said storage type phosphor sheet; and at least one erasing unit, all of the erasing units being disposed on the other of said first and second sides of said storage type phosphor sheet when said sheet is received by said apparatus to erase radiation image information on the other of said first and second sides of said storage type phosphor sheet, said erasing units being disposed in a position substantially opposed to said reading units, wherein each of said erasing units comprises an erasing light source and a light shielding member movable toward and away from a direction in which said storage type phosphor sheet is fed, said light shielding member preventing erasing light emitting from said erasing light source from entering a respective one of said reading units.

5. The apparatus according to claim 4 further including a casing having one end opened on the side of said storage type phosphor sheet, and wherein said erasing light source is disposed within said casing and said light shielding member is movably provided on the side of said opened one end of said casing.

6. A radiation image information reading apparatus adapted for use with a double-sided storage type phosphor sheet having first and second sides and capable of storing radiation image information on said first and second sides, comprising:

a reading unit disposed on one side of a double-sided storage type phosphor sheet when said sheet is received by said apparatus, said reading unit exposing said one of said first and second sides of said storage type phosphor sheet to a stimulating ray for thereby photoelectrically reading information via light emitted from said storage type phosphor sheet;

an erasing unit disposed on the other of said first and second sides of said storage type phosphor sheet when said sheet is received by said apparatus to erase radiation image information on the other of said first and second sides of said storage type phosphor sheet, wherein said erasing unit comprises an erasing light source and a light shielding member movable toward and away from a direction in which said storage type phosphor sheet is fed, said light shielding member preventing erasing light emitted from said erasing light source from entering said reading unit; and drive means for displacing said light shielding member back and forth along said storage type phosphor sheet in synchronism with the feeding of said storage type phosphor sheet, wherein an operation of said reading unit reading said information from said one of said first and second sides of said storage type phosphor sheet and an operation of said erasing unit erasing said image information from said other of said first and second sides of said storage type phosphor sheet are simultaneously performed with respect to said first and second sides of said phosphor sheet.

7. The apparatus according to claim 6, further including a casing having one end opened on the side of said storage type phosphor sheet, and wherein said erasing light source is disposed within said casing and said light shielding member is movably provided on the side of said opened one end of said casing.

* * * * *